Patented Feb. 12, 1952

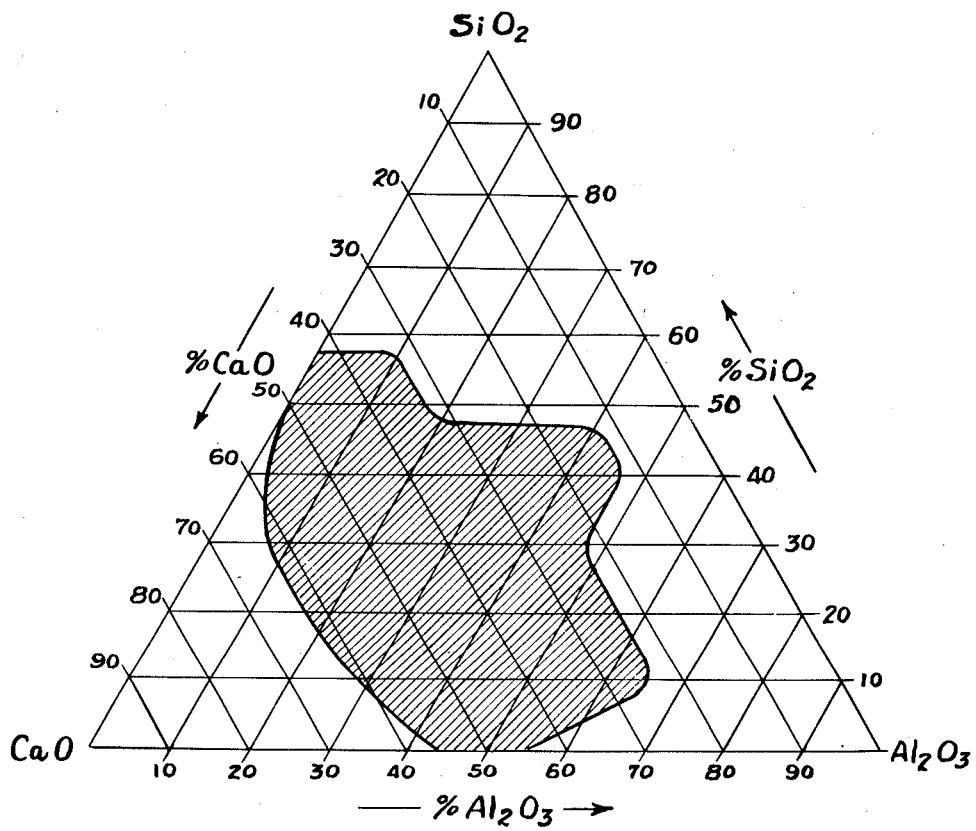

2,585,568

UNITED STATES PATENT OFFICE 2,585,568

ELECTRIC CLADDING

Marcus W. Marshall and James H. Waxweiler, Middletown, Ohio, assignors to Armco Steel Corporation, Middletown, Ohio, a corporation of Ohio Application November 26, 1948, Serial No. 62,182

6 Claims. (Cl. 219—10)

This invention relates to using a flux in the electric cladding of one piece of metal with a layer of another metal. The general method to which our present invention relates is disclosed and claimed in the copending application of Robert E. Kinkead, Serial No. 579,255, filed February 22, 1945, now abandoned, and in the copending application of M. W. Marshall and W. B. Browning, Serial No. 59,384, filed November 10, 1948, now Patent No. 2,510,123.

In accordance with the teachings of the above mentioned applications a flux is used both as an insulator between the slab and the metal being clad onto the slab in the form of arc electrodes paralleling each other and the slab surface, and as a covering over the electrodes and slab.

In the practice of the processes disclosed in said applications difficulties have been encountered in the production of uniform results, and we have determined that the inconsistencies found were due to the use of improper fluxes; and it is therefore the principal object of our present invention to provide a series of fluxes within certain composition ranges which will produce uniformly good results from the cladding standpoint. We have found that the flux used in the cladding process has an important bearing, if not a controlling one, on the quality and character of the cladding produced, that is, proper fluxes will produce sound, smooth, crack-free deposits while other fluxes will produce discontinuous, irregular and cracked deposits. The flux also has a bearing on the penetration produced in the cladding, as well as on the dilution.

The objects of our invention therefore include the use of fluxes which will produce sound, smooth, crack-free and uniform deposits and which will do so consistently. Further objects of our invention include the use of a flux which will be inexpensive and which can be used over again if desired.

These and other objects of our invention which we will point out in more detail hereinafter or which will be clear to those skilled in the art upon reading these specifications we accomplish by that composition of matter of which we shall now describe certain exemplary embodiments. Reference is had to the drawings forming a part hereof and in which the single figure is a triangular diagram graph illustrating weight-ratios of lime, silica, and alumina which will produce satisfactory fluxes for electric cladding purposes. Briefly, a flux according to our invention comprises these three compounds in such amounts, that with respect to their total weight, there shall be not more than 58% silica, between 12 and 63% lime, and not more than 65% alumina. The balance of the flux may consist of magnesia (MgO), fluorite ($CaF_2$), chromite ($Cr_2O_3$), iron oxide (FeO), and other substances except as limited or excluded according to the teachings of the disclosure. The three primary ingredients together will constitute the major portion of the flux. This flux is preferably prefused. A flux having a composition such that the ratios of lime, silica and alumina are in the range covered by the shaded portion of the diagram will produce a continuous, smooth, sound and crack-free deposit, whereas fluxes having a composition outside the shaded area of the diagram will produce discontinuous, irregular or cracked deposits.

For example, an excellent flux for this purpose consists of about 42% lime, about 34% silica, and about 5% alumina, together with about 10% magnesia, 5% calcium fluoride (from fluorite), 4% iron oxide, and other minor impurities, the three first named ingredients of this flux bear the following relations to each other: lime approx. 52%, silica 42%, alumina 6%. This composition will be seen to lie within the shaded area of the diagram.

The various commercial welding fluxes available on the market are outside our composition ranges and are generally unsatisfactory for cladding. Although some of these fluxes will produce crack-free deposits they produce a greater dilution than the fluxes discussed above.

It has been pointed out that the percentage of silica should not exceed 58 per cent. We have found that with silica in excess of 58 per cent of the composition of the three principal elements there is produced a very violent arc action and a non-continuous deposit.

We have found that certain finishing slags from electric furnace heats are sufficiently uniform and have a composition within the ranges herein taught, such that they will furnish satisfactory fluxes. Deposits made with such finishing slag are sound, crack-free and have a smooth surface.

We have pointed out above that the flux preferably should be prefused. The reason for this is that the fusion points of the component oxides are very high (CaO fuses at 4660° F.), while the fluxes fuse at around 2600 to 3000° F. With many compositions within the ranges disclosed the high melting points of unfused ingredients result in violent arc action and poor deposits. Some compositions will produce usable deposits without prefusion, but in general better results are obtained if the flux ingredients have been melted together before use as a cladding flux.

We have found that the particle size of the flux is important particularly for the covering flux. Where the flux is used for insulation between the slab and the cladding metal variations in particle size within the range of 10 mesh and finer appear to have very little effect. This refers to No. 10 U. S. standard sieve size. Where the flux is used as a covering flux however we find that there is a definite decrease in the surface quality of the deposit when the particle size is larger than 10 mesh. We prefer therefore that the particle size of the flux be such that it will pass through a 10 mesh screen particularly where that flux is to be used as a covering flux. Contrary to normal expectations the fineness of the covering flux does not have a tendency to blanket the arc and decrease the speed nor does it exert a harmful effect on the deposit. On the contrary the surface is smoother where a small particle size is used.

The thickness of the flux layer which insulates the slab from the cladding metal will depend to some extent on the current density and voltage which is being used. Generally speaking however we find that a layer thickness between $\frac{1}{16}$ of an inch and $\frac{1}{2}$ of an inch is satisfactory. With a thickness of $\frac{1}{16}$ of an inch we have found that even with a current density of 7000 amps. per square inch the arc failed and the deposit was discontinuous.

Fluxes used in our invention have an excellent life, and we have found that flux cake which has been previously used may be recrushed, screened and used over again both as an insulation and a covering flux. The resulting deposits are just as sound, crack-free and smooth as those produced with the original flux and show no increase in dilution or reduction of chrome efficiency.

There are certain ingredients which if present should be kept to small quantities. For example, iron oxide ($Fe_2O_3$) is undesirable in large quantities. Very small percentages of iron oxide have very little effect in the appearance of the deposit but with additions of about 10 per cent of iron oxide the flux will become magnetic, and thereafter the deposit will definitely be inferior in surface, in penetration, in smoothness and freedom from cracks. Iron oxides should, therefore, be kept below 10 per cent.

Fluorite ($CaF_2$) is also undesirable in large quantities, causing violent arc action and poor deposits. It should preferably be kept below 10 per cent.

It is also desirable to keep calcium carbonate ($CaCO_3$) out of the flux. Calcium carbonate is a gas former, and the flux in the cladding process will become so gaseous that it will be difficult to maintain the arc. The arc blows the molten flux away from the exposed end of the electrode and causes the arc to fall. The addition of even 10 per cent of a gas forming substance such as calcium carbonate to the cover flux will produce an inferior deposit.

It will be clear that numerous changes in the exact compositions of the elements can be made within the ranges set forth by us herein. It will also be clear that there are certain types of compounds which should not be used in connection with the flux used in our invention. We therefore intend to use only fluxes which satisfy the various requirements both positive and negative set forth herein.

Having now fully described our invention, what we claim as new and desire to secure by Letters Patent is:

1. In the electric cladding of a piece of one metal with a layer of another metal by the self-consuming prone electrode process, the step of insulating the electrode from the base metal by spreading on the base metal a layer between substantially $\frac{1}{16}''$ and $\frac{1}{2}''$ in thickness said layer composed of a prefused flux consisting essentially of silica, lime and alumina in proportions substantially within the shaded area of the figure.

2. In the electric cladding of a piece of one metal with a layer of another metal by the self-consuming prone electrode process, the step of insulating the electrode from the base metal by spreading on said base metal a layer between substantially $\frac{1}{16}''$ and $\frac{1}{2}''$ in thickness, said layer consisting essentially of a prefused flux composed of electric furnace finishing slag, wherein the ingredients lime, alumina and silica are present in proportions substantially within the shaded area of the figure.

3. The process of claim 1 in which the individual particles of said flux are of a size which will pass through a 10 mesh screen.

4. The process of claim 2, in which the individual particles of said flux are of a size which will pass through a 10 mesh screen.

5. In the electric cladding of a piece of one metal with a layer of another metal by the self-consuming prone electrode process, the steps of insulating the electrode from the base metal by spreading on the base metal a layer between substantially $\frac{1}{16}''$ and $\frac{1}{2}''$ in thickness, and blanketing said electrode with an additional layer, said layers composed of a prefused flux consisting essentially of silica, lime and alumina in proportions substantially within the shaded area of the figure.

6. In the electric cladding of a piece of one metal with a layer of another metal by the self-consuming prone electrode process, the steps of insulating the electrode from the base metal by spreading on said base metal a layer between substantially $\frac{1}{16}''$ and $\frac{1}{2}''$ in thickness, and blanketing said electrode with an additional layer, said layers consisting essentially of a prefused flux composed of an electric furnace finishing slag, wherein the ingredients lime, alumina and silica are present in proportions substantially within the shaded area of the figure.

MARCUS W. MARSHALL.
JAMES H. WAXWEILER.

REFERENCES CITED

The following references are of record in the file of this patent:

UNITED STATES PATENTS

| Number | Name | Date |
|---|---|---|
| 2,056,162 | Arness | Oct. 6, 1936 |
| 2,096,318 | Browne | Oct. 19, 1937 |
| 2,150,625 | Jones et al. | Mar. 14, 1939 |
| 2,191,469 | Hopkins | Feb. 27, 1940 |
| 2,191,473 | Blumberg | Feb. 27, 1940 |
| 2,200,737 | Clapp | May 14, 1940 |
| 2,228,639 | Miller | Jan. 14, 1941 |
| 2,288,836 | Perrin | July 7, 1942 |
| 2,290,961 | Heuer | July 28, 1942 |
| 2,408,241 | Sturbelle | Sept. 24, 1946 |
| 2,510,123 | Marshall et al. | June 6, 1950 |

OTHER REFERENCES

Burdakov et al., Chemical Abstracts, 1944, column 4242.